United States Patent [19]

Schriks et al.

[11] Patent Number: 5,107,537
[45] Date of Patent: Apr. 21, 1992

[54] OPTOELECTRONIC DEVICE HAVING A COUPLING COMPRISING A LENS AND ARRANGED BETWEEN AN OPTICAL TRANSMISSION FIBER AND A SEMICONDUCTOR LASER DIODE

[75] Inventors: Cornelis G. Schriks; Hermanus A. Van De Pas, both of Nijmegen; Jan W. Kokkelink; Hendricus F. J. J. Van Tongeren, both of Eindhoven, all of Netherlands

[73] Assignee: U.S. Philips Corp., New York, N.Y.

[21] Appl. No.: 622,669

[22] Filed: Dec. 5, 1990

[30] Foreign Application Priority Data

Jan. 5, 1990 [NL] Netherlands ............... 9000027

[51] Int. Cl.$^5$ .............................................. G02B 6/42
[52] U.S. Cl. ...................................... 385/91; 385/93
[58] Field of Search .............. 350/96.15, 96.18, 96.20, 350/96.17; 357/17, 74, 80, 81, 84, 85; 385/35, 90, 91, 92, 93

[56] References Cited

U.S. PATENT DOCUMENTS

| 4,726,648 | 2/1988 | Haberland et al. | 350/96.20 |
| 4,790,618 | 12/1988 | Abe | 350/96.15 |
| 4,803,689 | 2/1989 | Shibanuma | 350/96.20 X |
| 4,927,228 | 5/1990 | Van De Pas | 350/96.20 |

FOREIGN PATENT DOCUMENTS

| 61-20912 | 1/1986 | Japan | 350/96.15 |
| 61-138216 | 6/1986 | Japan | 350/96.15 |
| 61-239209 | 10/1986 | Japan | 350/96.15 |
| 7904283 | 12/1980 | Netherlands | 350/96.17 |

Primary Examiner—John D. Lee
Attorney, Agent, or Firm—Ernestine C. Bartlett

[57] ABSTRACT

An optoelectronic device with a coupling is provided, comprising a lens (10), between an optical transmission fiber (13) and a semiconductor laser diode (2), which device is provided with a holder (1) for the laser diode, a holder (12) for the optical transmission fiber and an intermediate piece (16) present between these two holders, the spherical lens (10) being accommodated in the cover (9) of the holder (1) of the laser diode (2), while the holder (12) of the transmission fiber contains a hollow glass rod (14) in which a core portion (11) of the transmission fiber is accommodated, the end (15) of the glass rod and the fiber core being flat and polished, while the intermediate piece (16) has a sleeve shape and slides with exact fit over the cover (9) of the holder of the semiconductor laser diode (2), which sleeve-shaped intermediate piece has two grooves spaced some distance apart, at which grooves the intermediate piece and the cover of the holder of the semiconductor laser diode are fastened to one another by means of a number of laser welds after axial alignment, while furthermore the ends of the intermediate piece (16) and the holder (12) for the transmission fiber (11) facing one another have flat surfaces perpendicular to the axial alignment direction, which surfaces are fastened to one another with a plurality of laser welds after transversal adjustment.

6 Claims, 2 Drawing Sheets

OPTOELECTRONIC DEVICE HAVING A COUPLING COMPRISING A LENS AND ARRANGED BETWEEN AN OPTICAL TRANSMISSION FIBER AND A SEMICONDUCTOR LASER DIODE

FIELD OF THE INVENTION

The invention relates to an optoelectronic device having a coupling comprising a lens and arranged between an optical transmission fiber and a semiconductor laser diode, which device is provided with a holder for the semiconductor laser diode, a holder for the optical transmission fiber, and an intermediate piece present between the said two holders, the intermediate piece and one of the two holders being so arranged that they can be slipped one into the other, while after axial adjustment of the end of the transmission fiber the intermediate piece and this holder are fastened to one another by means of a number of laser welds, the ends of the intermediate piece and of the other holder facing one another having flat surfaces perpendicular to the axial alignment direction, which surfaces lie against one another and are fastened to one another with a number of laser welds.

BACKGROUND OF THE INVENTION

Such a device is known from EP-A-345 874 which corresponds substantially to U.S. Pat. No. 4,927,228. In this known device, the two holders and the intermediate piece are adjustable relative to one another both in axial and in transversal direction, while the use of laser welds on thinned portions leads to a fastening which exerts hardly any thermal and mechanical forces and thus does not cause any gradual mis-alignment. In the embodiment shown in FIG. 3 of EP-A-345 874, in which a lens is used, this lens has a rod-shape and is included in the intermediate piece. The holder for the semiconductor laser diode is shaped as a sleeve here, in which the envelope of the semiconductor laser diode is accommodated. This sleeve is axially adjustable relative to the intermediate piece. The lens is aligned relative to the semiconductor laser diode in this case. The end of the optical transmission fiber is set at a fixed distance from the lens in an adaptor.

This arrangement gives a sufficient accuracy for obtaining a good coupling efficiency for a multimode optical transmission fiber. In the case of a single-mode optical transmission fiber, however, it is difficult to obtain in a reproducible manner the desired alignment accuracy and stability with this device.

SUMMARY OF THE INVENTION

An object of the invention is to provide an optoelectronic device of the kind described in the opening paragraph which has the required alignment accuracy and stability in a reproducible manner when a single-mode optical transmission fiber is used, which device is nevertheless of a simple construction, of small dimensions, and non-critical as regards alignment accuracy and product tolerances.

According to the invention, this object is achieved in a device of the kind described in the opening paragraph i.e. in an optoelectronic device having a coupling comprising a lens and arranged between an optical transmission fiber and a semiconductor diode, which device is provided with a holder for the semiconductor laser diode, a holder for the optical transmission fiber, and an intermediate piece present between the said two holders, the intermediate piece and one of the other two holders being so arranged that they can be slipped one into the other, while after axial adjustment of the end of the transmission fiber the intermediate piece and this holder are fastened to one another by means of a number of laser welds, the ends of the intermediate piece and of the other holder facing one another having flat surfaces perpendicular to the axial alignment direction, which surfaces lie against one another and are fastened to one another with a number of laser welds, wherein the lens is constructed as a spherical lens which is accommodated in a cover of the holder of the semiconductor laser diode facing the transmission fiber, and wherein the holder of the optical transmission fiber is provided with a hollow glass rod in which a core portion of the optical transmission fiber is accommodated, the end of the glass rod facing the lens and the transmission fiber core being flat and polished and the intermediate piece having the shape of a sleeve which can be slipped with exact fit over the cover of the holder of the semiconductor diode, which sleeve-shaped intermediate piece has two grooves spaced apart from one another, at which grooves the intermediate piece and the cover of the holder of the semiconductor laser diode are fastened to one another by means of a number of laser welds.

It has been found that the adjustment of a spherical lens accommodated in the cover of the envelope of the semiconductor laser diode relative to this laser diode requires only a relatively small degree of accuracy, i.e. less than approximately 50 μm, in the X, Y and Z directions, while nevertheless a very favourable adjustment of the end of the optical transmission fiber through the lens relative to the laser diode is made possible. Reasonable manufacturing tolerances are consequently admissible without the adjustment accuracy being adversely affected. Moreover, this arrangement is conducive to obtaining small dimensions of the device. The sleeve-shaped intermediate piece which is mounted directly to the cover of the envelope of the semiconductor laser diode also renders small dimensions possible. The fastening at the location of the spaced-apart longitudinal grooves facilitates a very accurate alignment of the end of the transmission fiber relative to the lens, an angular deviation in axial direction being avoided. In the embodiment according to the invention, a single-mode optical transmission fiber is also coupled to the semiconductor laser diode with a very favourable efficiency. This latter component, therefore, can have small dimensions and is relatively insensitive to alignment inaccuracies and production tolerances, while neverthless an extremely favourable coupling efficiency is obtained.

It should be noted that the use of a spherical lens is known per se. The invention, however, does not achieve its favourable effect through the use of a spherical lens only, but through the overall combination of measures as defined herein. This combination is essential if the favourable effect of the device according to the invention is to be achieved.

In a preferred embodiment of the invention, a single-mode optical transmission fiber is used and the flat, polished end of the glass rod and the transmission fiber core is arranged at an oblique angle of 5°–15° relative to a plane perpendicular to the axial alignment direction. In this way the coupling has low losses and reflection of radiation to the laser diode is avoided.

In a further embodiment of the invention, the holder of the optical transmission fiber is provided with a connector, to which an external optical transmission fiber can be coupled. This renders the component defined above, which may be designed as a pigtailed device, also suitable as a connectorized device.

BRIEF DESCRIPTION OF THE DRAWINGS

The invention will be explained in more detail with reference to an embodiment shown in the drawing by way of example, in which.

DETAILED DESCRIPTION OF THE PREFERRED EMBODIMENTS

Figure 1:
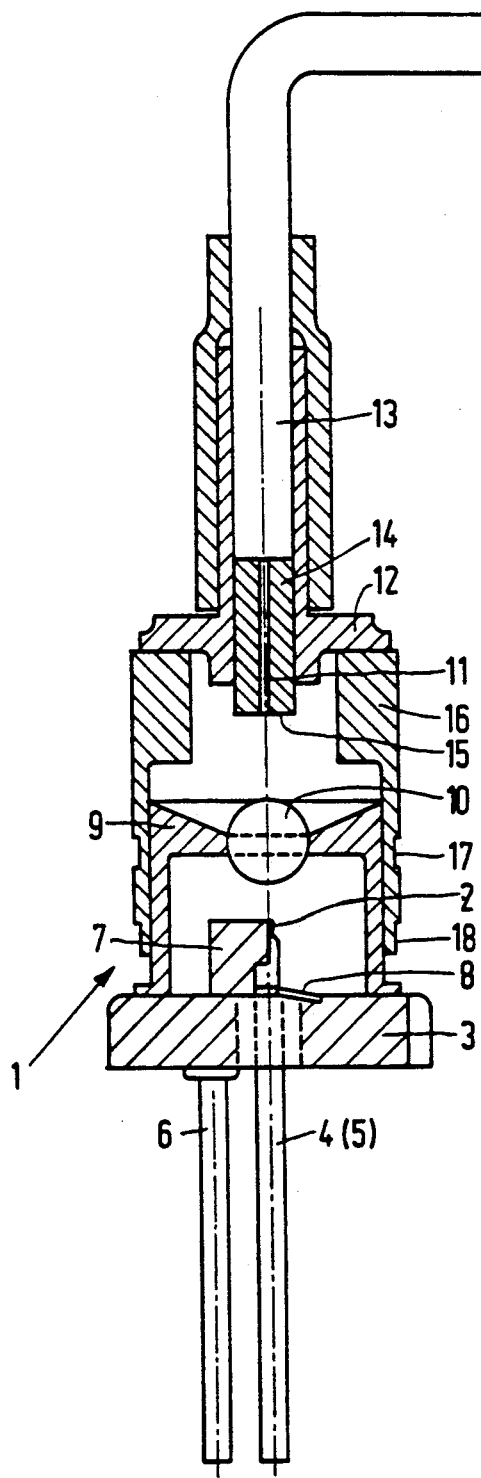
FIG. 1 shows a longitudinal cross-section of an optoelectronic device according to the invention in the form of a pigtailed device.
Figure 2:
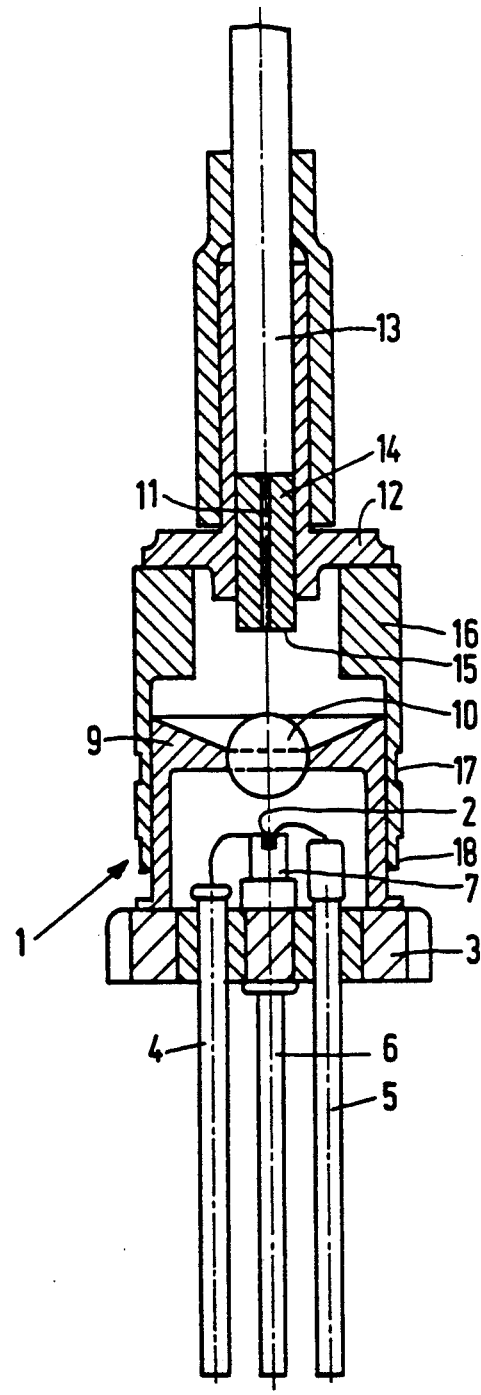
FIG. 2 shows the same device rotated through 90°.

FIGS. 1 and 2 show a device according to the invention in longitudinal cross-section which may serve as a component for various applications.

The holder 1 for the semiconductor laser diode 2 comprises a metal base 3 through which two electrical connection pins 4 and 5 are passed in an insulated manner and to which a ground connection pin 6 is fastened. The base 3 carries a metal pillar 7 to which the semiconductor laser diode 2 is fastened. The quantity of radiated light of the semiconductor laser diode 2 directed towards the base is measured with a photodiode 8. The signal thus generated in the photodiode can be used to control the emission intensity of the semiconductor laser diode 2. A cover 9 is provided on the base 3, preferably by means of resistance welds. A spherical lens 10 is accommodated in the upper portion of the cover 9. The laser diode 2 is hermetically enclosed in the holder 1.

The adjustment of the spherical lens 10 relative to the laser diode need not be particularly accurate in order to obtain a favourable alignment of the laser diode 2 through the lens 10 relative to the end of the optical transmission fiber 11. An adjustment inaccuracy of less than 50 μm of the lens 10 relative to the semiconductor laser diode 2 is sufficient to obtain a favourable alignment relative to the optical transmission fiber, which is a very wide margin in semiconductor technology; therefore, the manufacturing and adjustment tolerances may be fairly wide while coupling remains favourable, which renders a simple manufacture possible.

The holder 12 for the optical transmission fiber 13 comprises a flat, annular portion in which a hollow glass rod 14 is accommodated, enclosing the core portion 11 of the optical transmission fiber. The glass rod 14 with the core portion 11 of the transmission fiber projects from the annular portion 12 towards the exterior in the direction of the lens 10. The surface 15 of the glass rod and the fiber core, therefore, can be flattened and polished without difficulties, so that a favourable coupling relative to the lens 10 can be obtained. As is shown in FIG. 2, this surface 15 can be arranged at an angle of 5°-15° relative to a plane perpendicular to the longitudinal direction of the device, so that feedback of the radiation emitted by the semiconductor laser diode 2 is prevented.

The holder 1 for the semiconductor laser diode 2 and the holder 12 for the optical transmission fiber 13 are interconnected by an intermediate piece or bush 16. This intermediate piece has the shape of a sleeve in the embodiment shown by way of example. It slides with exact fit around the cylindrical circumference of the cover 9 of the holder 1 of the semiconductor laser diode 2. The upper surface of the intermediate piece 16 is connected to the annular holder 12 of the optical transmission fiber by means of laser welds. The sleeve has two grooves 17 and 18 which are spaced a certain distance apart. The bush 16 may be fastened to the cover 9 by means of laser welds at these thinned portions. This fastening by means of the spaced grooves guarantees a very accurate angular adjustment in the axial direction, so that an accurate coupling of the transmission fiber 11 relative to the lens 10, and thus relative to the semiconductor laser diode 2, is obtained.

The adjustment of the holder 12 relative to the intermediate piece 16 in the transversal direction, and the adjustment of the intermediate piece 16 relative to the cover 9 of the holder 1 of the semiconductor laser diode in the axial direction render it possible to achieve an excellent coupling, for which the manufacturing tolerances are allowed to be comparatively wide.

The component described above, which consists of a pigtailed device in the example shown, may also be constructed as a connectorized device. Generally, the holder 12 of the optical transmission fiber may be provided with a connector to which an external optical transmission fiber can be coupled.

Figure 3:
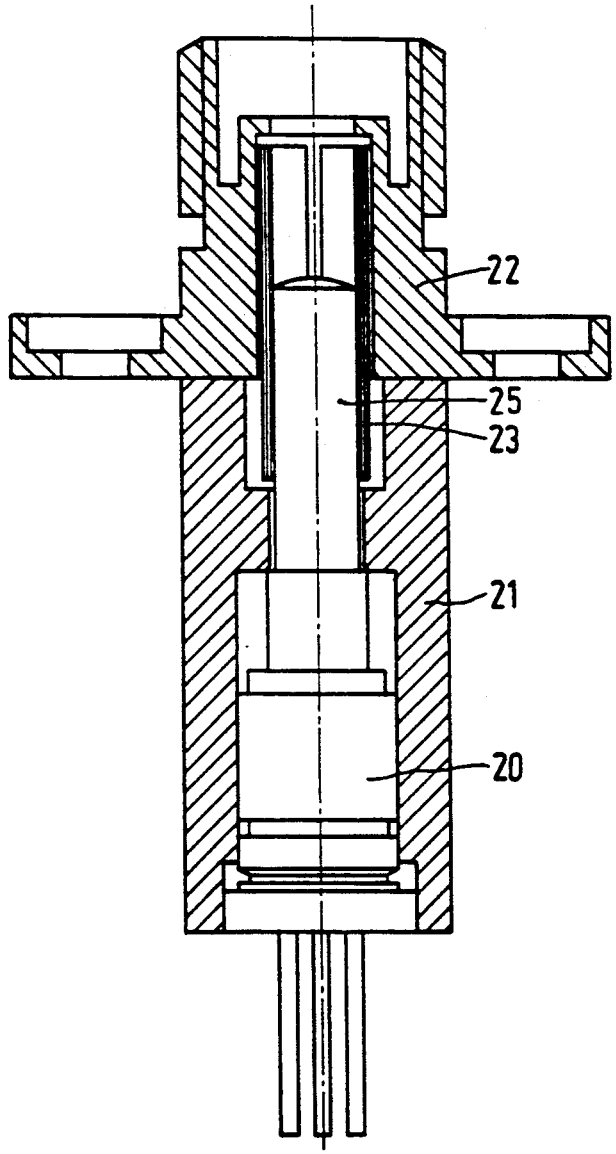
FIG. 3 shows a first specific embodiment of a connectorized device.
Figure 4:
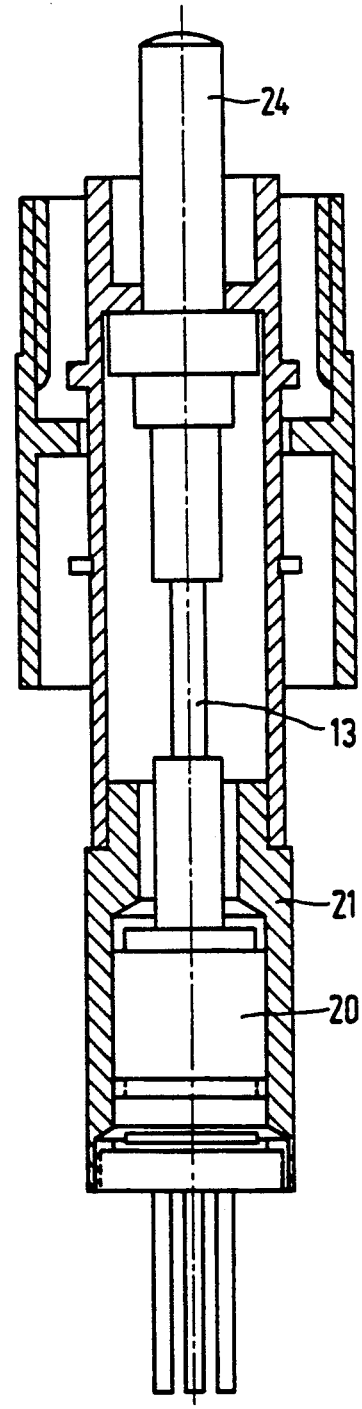
FIG. 4 shows a second specific embodiment of a connectorized device.

FIGS. 3 and 4 give specific examples of embodiments of connectorized devices having a female and a male connector, respectively.

FIG. 3 shows the component 20 described above provided with a ferrule 25 whose shape corresponds approximately to that of the holder 12 in FIGS. 1 and 2, which component is accommodated in a carrier member 21 to which a connector part 22 is fastened. The end of the optical fiber accommodated in the ferrule 25 of the component 20 is coupled to an optical fiber present in an external connector, such as a standard FC ferrule, in a reproducible, favourable manner by means of a centering spring 23.

FIG. 4 shows an example of a male connector. The component 20 is accommodated in a carrier member 21. The optical transmission fiber 13 of the component issues into a male FC ferrule 24. This embodiment is less sensitive to pollution since it can be easily cleaned. Both in the embodiment of FIG. 3 and in the embodiment of FIG. 4, the end of the ferrule projecting from the component 20 can be polished in convex shape. This promotes a good physical contact between the ferrule and a transmission fiber to be coupled. The same holds for the end of a ferrule present in the connector and facing the component 20. Particularly, it is useful for the end of a connectorized device of the female type to be given a convex polished end, since reflections from the connector end to the laser are avoided by this. This is true for the use of both an FC (with a flat polished surface) and a PC (with a convex polished surface) male connector in which the transmission fiber to be connected is enclosed. In the case of the male-type connectorized device, the end is less critical as regards reflections because of the greater distance between the reflecting connector end surface and the laser. It should be noted that an additional advantage of the embodiments of FIGS. 3 and 4 is that ferrules other than FC ferrules may be used, such as those in DIN, ST, SMA, SC, FC, FC—PC and Biconic connectors.

The carrier member 21 is connected to the connector part 22, for example, by welding or gluing. Preferably, the parts 21 and 22 are interconnected by a screw connection. This renders it possible, when the end of the ferrule 25 has become polluted during use, to clean this end after the connection has been unscrewed.

We claim:

1. An optoelectronic device having a coupling comprising a lens and arranged between an optical transmission fiber and a semiconductor laser diode, which device is provided with a holder for the semiconductor laser diode, a holder for the optical transmission fiber, and an intermediate piece present between the said two holders, the intermediate piece and one of the two holders being so arranged that they can be slipped one into the other, and after axial adjustment of the end of the transmission fiber the intermediate piece and this holder are fastened to one another by means of a number of laser welds, the ends of the intermediate piece and of the other holder facing one another having flat surfaces perpendicular to the axial alignment direction, which surfaces lie against one another and are fastened to one another with a number of laser welds, characterized in that: (a) the lens is constructed as a spherical lens which is accommodated in a cover of the holder of the semiconductor laser diode facing the transmission fiber,; (b) the holder of the optical transmission fiber is provided with a hollow glass rod in which a core portion of the optical transmission fiber is accommodated, the end of the glass rod facing the lens and the transmission fiber core being flat and polished; (c) the intermediate piece has the shape of a sleeve which can be slipped with exact fit over the cover of the holder of the semiconductor diode,; and (d) the sleeve-shaped intermediate piece has two grooves spaced apart from one another, at which grooves the intermediate piece and the cover of the holder of the semiconductor laser diode are fastened to one another by means of a plurality of laser welds.

2. An optoelectronic device as claimed in claim 1, wherein a single-mode optical transmission fiber is used and the flat, polished end of the glass rod and the transmission fiber core are arranged at an oblique angle of 5°–15° relative to a plane perpendicular to the axial alignment direction.

3. An optoelectronic device as claimed in claim 1, wherein the holder for the optical transmission fiber comprises a flat, annular part which, after being adjusted relative to the intermediate piece, is fastened to the latter by means of laser welds and which surrounds the glass rod with the transmission fiber core which project from this annular part to the exterior at the end facing the lens.

4. An optoelectronic device as claimed in claim 1, wherein the holder of the optical transmission fiber is provided with a connector to which an external optical transmission fiber can be coupled.

5. An optoelectronic device as claimed in claim 4, having a carrier member around the sleeve-shaped piece, to which carrier member a connector part is fastened, the coupling with an optical transmission fiber present in an external connector being achieved by means of a centering spring.

6. An optoelectronic device as claimed in claim 4, having a carrier member around the sleeve-shaped piece, the optical transmission fiber of the optoelectronic device issuing into a male standard ferrule.

* * * * *